Jan. 9, 1934.   R. T. OSMAN   1,943,141
TRACTION BELT FOR TRACTORS
Filed March 10, 1931   2 Sheets-Sheet 1
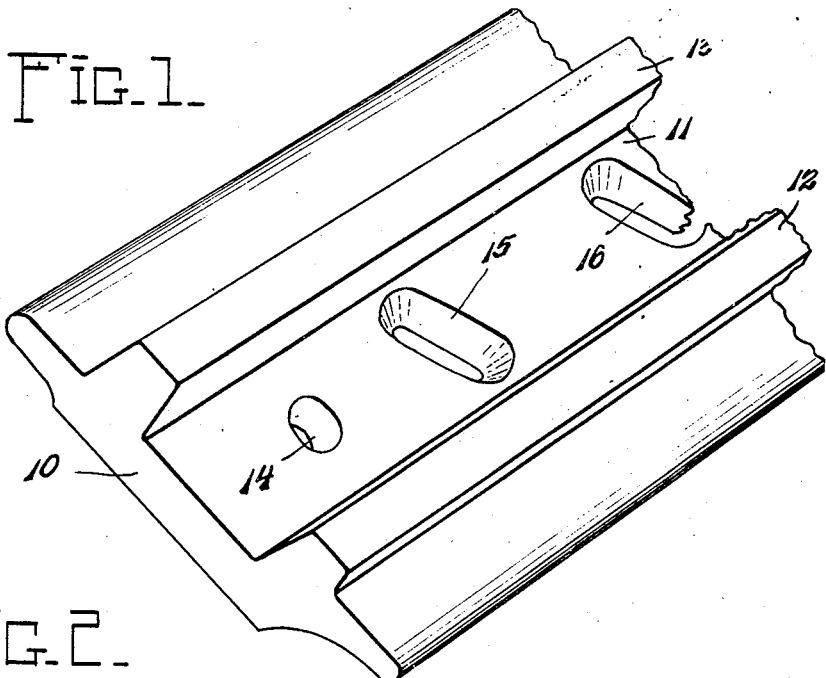
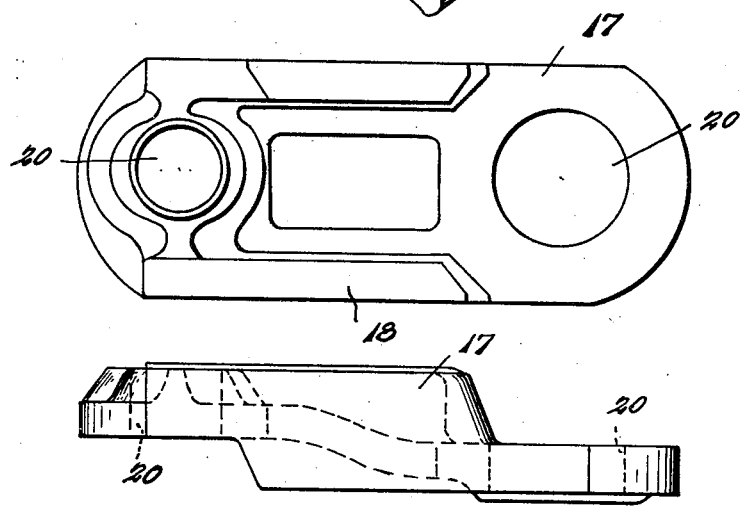
Inventor
R. T. OSMAN.
By Robert Rob
Attorney Jan. 9, 1934.  R. T. OSMAN  1,943,141
TRACTION BELT FOR TRACTORS
Filed March 10, 1931   2 Sheets-Sheet 2
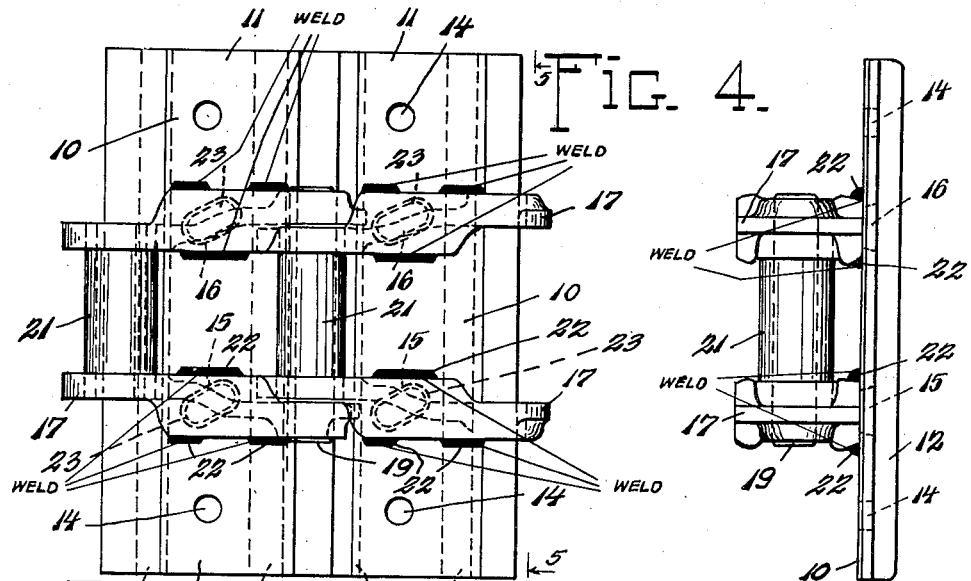
Fig. 4.
Fig. 5.
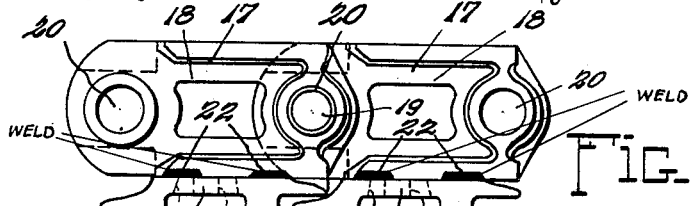
Fig. 6.
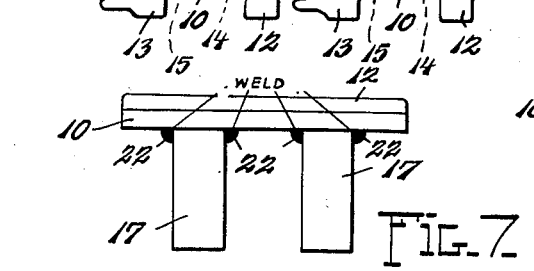
Fig. 7.
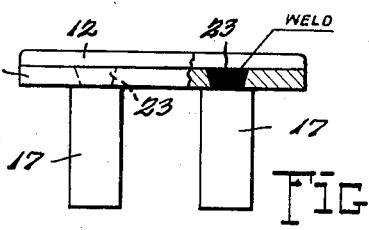
Fig. 8.
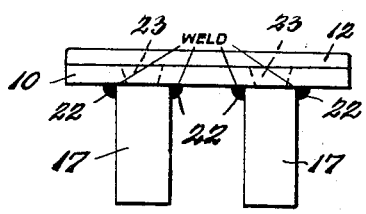
Fig. 9.
Inventor
R. T. OSMAN.
By
Attorneys Patented Jan. 9, 1934

1,943,141

UNITED STATES PATENT OFFICE 1,943,141

TRACTION BELT FOR TRACTORS

Ralph T. Osman, Milwaukee, Wis., assignor to Koehring Company, Milwaukee, Wis., a corporation Application March 10, 1931. Serial No. 521,583

1 Claim. (Cl. 305—10)

Experiments and developments of tractors have shown that one of the most important features affecting the commercial success of a track type tractor is the track shoe. Many types and forms of track shoes have been utilized and experimented with, and it has been found that, other factors being equal, the life and serviceability of the tractor is increased almost exactly in accordance with the improvement in the track shoe.

The present invention, therefore, deals with improvements in the fabrication of traction belts for use on tractors of the "crawler" or "endless-traction" type, wherein the belt consists of a series of articulated links secured to the traction shoes, and more especially, the invention relates to the manner of uniting each shoe and link of the respective sections forming the belt.

Other objects of the invention include the provision of a traction shoe provided with a dual tread; the provision of such a shoe provided with means or instrumentalities permitting the attachment to the tread side of the shoe of "cleats" or "grousers" for increasing the traction; the provision of traction shoes which overlap at their adjacent ends for reducing accumulation of mud and dirt in the link sections; to provide links which are either closed or formed with open grid-like construction of the sides of the link permitting lateral dislodgement of dirt, mud, and other foreign materials from the sections; to provide the shoes with means or instrumentalities whereby the shoes may be welded to the links by means of a "rivet weld", or a weld at the angles formed by the juncture of the link faces with the shoe, or, as a third form of weld, the combination of the rivet weld and this angle weld.

The invention will be readily understood by reference to the accompanying drawings in which:—

Figure 1 represents a perspective view of the tread side of a traction shoe plate formed in accordance with this invention.

Figure 2 represents a side elevation of a link of a shape well adapted for use with the shoe plate of Figure 1.

Figure 3 represents a top view of the link of Figure 2.

Figure 4 represents a plan view of a part of sections of a traction belt, which sections are formed in accordance with this invention.

Figure 5 is an end elevation of the sections of Figure 4 looking in the direction of the arrows 5—5.

Figure 6 is a side elevation of the sections of Figure 4 taken at right angles to the view illustrated in Figure 5.

Figure 7 is a diagrammatic view showing the shoe plate and links of a section of traction belt such as illustrated in Figure 4 wherein the shoe plate and links are united by means of angle welds formed at the intersection of the sides of each link with the traction shoe plate.

Figure 8 is a view similar to Figure 7, but showing the links and shoe plate united by a rivet weld; and, Figure 9 is a view similar to Figures 7 and 8, but showing the links and traction shoe plate united by a combination of rivet and angle welds.

Referring more particularly to the drawings, the traction shoe plate is represented in general by the numeral 10, the shoe plate 10 being provided with a transverse groove 11 defining the ribs 12 and 13, these ribs serving to increase the traction of the plate. The shoe plate 10 is provided with a series of apertures or holes, there being two holes represented by 14, and two of the taper slot configuration illustrated at 15 and 16.

The tapered slots 15 and 16 are equally spaced from each end of the shoe plate, these tapering slots being dove-tailed in cross-section, and are means readily permitting the union of the shoe plate 10 with the link 17 through the production of a rivet weld to form a rugged union between the shoe plate 10 and each of the pair of links 17 secured to the shoe plate 10 to form each traction belt section.

The holes 14 provide ready means for attachment of "cleats" or "grousers" to the tread side of the traction shoe plate 10, as is well known in the art, when it is desired to increase the traction.

As illustrated, the link 17 is formed with an open grid-like construction of its sides, as illustrated at 18, although it will be understood that the sides of the link may be closed as desired. The link illustrated shows one type of link suitable for use in this connection, but it, itself, is a form already known in the art.

The traction shoe 10 is formed conveniently by passing a bar of suitable metal through rolling means, including one or more sets of rollers which are suitably contoured to effect the desired cross-section in the finished traction shoe.

The length of the bar from which the shoe plate 10 is formed is preferably such that when the bar has emerged from the rolling means, it is a multiple of a length of an individual shoe plate. The rolls through which the bar is passed are of such configuration as to produce the dual treads 12 and 13, which are integral ribs extending longitudinally of the rolled metal and extend parallel to the direction of rolling.

Emerging from the rolling means, the strip is then cut transversely of the ribs 12 and 13 and transversely of the direction in which the rolled strip progresses through the forming process. The cutting plane of the cutting instrumentalities is preferably inclined to the upper and lower faces of the strip thus producing beveled edges at both ends of the issuing plates. The plates, after thus cutting, are of the requisite cross-section, and dimensions of the finished track shoes, and are then passed through perforating means by which the holes 14, 15 and 16 are formed.

The thus finished shoe plates 10 are then secured to the links 17, as will be seen from Figures 4, 5, and 6. From these views, it will be seen that the ends of adjacent links are joined together by means of a rivet or bolt 19 passed through the holes 20 formed through each end of each link so as to register when the ends of successive links are brought together, thus forming an articulated joint between each successive link of the belt. The bolt 19 is desirably enclosed in a sleeve 21.

Figures 7, 8 and 9 illustrate diagrammatically alternative ways in which the shoe plate and links may be welded together. The welding gives a very strong and durable unit, which produces a highly efficient tread, is relatively inexpensive to produce, and is well adapted to quantity production.

It will be seen from these figures that the weld may be of a form illustrated in Figure 7, wherein the weld 22 is formed at the junction of the faces of each link 17 with the shoe plate 10. The method of welding employed is any of the well known processes of the art, and in itself forms no part of this invention.

In Figure 8, instead of the angle weld 22, there is employed a rivet weld 23 for uniting the shoe plate 10 to the links 17. This rivet weld is formed by welding through the slots 15 and 16 in the shoe plate 10, the tapering or dove-tailed section of the slots 15 and 16 producing a very strong and rugged union, the tapering configuration of the hole giving a progressively increasing strength to the bond between the links 17 and shoe plate 10 through the intermediary of the weld 23.

If further reinforcement is desired, the rivet weld of Figure 8, and the angle weld of Figure 7, may be combined as shown in Figures 4 and 9.

It will be also seen from the drawings, particularly Figures 4 and 6, that the adjacent ends of the shoe plates 10 overlap, thus preventing accumulation of foreign material between the shoe plates of each section; and also, it will be apparent that the pins or bolts 19 together with bushings 21 are so designed as to form a very flexible joint between each section of the belt.

No features of novelty are claimed for the shape of the link 17 or for the method of forming the shoe plates 10; but because of the ease of manipulation, its inexpensiveness, the strong union between the parts which is accomplished through its use, the application of welding to the fabrication of articles of this character possess advantages not heretofore realized in the art.

It will be understood that the form of the invention herein specifically illustrated and described, is to be regarded as typifying only the manner in which it is to be carried out, and that various alterations in the details thereof, can be made without departing from the inventive concept.

It will be accordingly understood that it is intended and desired to embrace within the scope of this invention such modifications and changes as may be required to adapt it to varying conditions and uses.

Having thus described my invention, what I claim as new and desire to secure by Letters Patent of the United States, is:—

A link section of the character described, comprising a shoe plate provided with transverse upstanding ribs defining a groove therebetween, and a plurality of links positioned edgeways relative to the said shoe plate, in engagement therewith and substantially parallel to each other, each of the said links being provided with reduced portions thereof adapted to overlap similar reduced portions of similar links mounted in a next succeeding link section of a series of link sections, each of the first mentioned links being secured to the said shoe plate by a rivet weld located in and through the base of the above mentioned groove and on the edge face of the link which engages the shoe plate, at the approximate longitudinal center of the said edge face, and by a plurality of welds located in the angles formed by nonengaging faces of the first-mentioned links and a surface of the shoe plate with which the aforesaid edge-face of the link engages, on each side of the longitudinal center of the said edge face and substantially remote therefrom.

RALPH T. OSMAN.